United States Patent Office 3,515,699
Patented June 2, 1970

3,515,699
STERILIZABLE BATTERY CONTAINERS
Eugene A. Burns, Palos Verdes Estates, and Hyman R. Lubowitz, Redondo Beach, Calif., assignors to TRW Inc., Redondo Beach, Calif., a corporation of Ohio
No Drawing. Filed May 8, 1967, Ser. No. 636,655
Int. Cl. C08g 17/00
U.S. Cl. 260—75                               4 Claims

ABSTRACT OF THE DISCLOSURE

A sterilizable battery container for non-aqueous electrolyte batteries which is molded from thermosetting block polymers of 1,2-polybutadiene-hydrocarbons or -polyethers. The thermoset block polymer containers are stable at sterilizing temperatures and are highly resistant to dissolution by organic electrolytes.

---

Exotic batteries employing unusual metal electrodes and electrolytes for special applications in space programs have become increasingly interesting in recent years. Where batteries of the prior-art employed aqueous electrolytes and relatively inactive metals, batteries employing highly reactive metals and organic electrolytes are presently under investigation. These advanced batteries have exceeded the state of the construction materials art to meet the unusual property requirements imposed by the components and the operating conditions.

To contain these new battery systems requires a material which will not dissolve in the presence of the organic electrolyte. Glass has proved to be a reasonably satisfactory construction material for the battery containers since it will not dissolve in the presence of the organic electrolyte, however, its fragility limits its application to instances where it will not be subjected to severe shock or impact. Another construction material which avoids the fragility of glass is non-plasticized, high density, polyethylene or polypropylene. While these two materials are sufficiently flexible to withstand severe shock or impact, and they are sufficiently resistant to dissolution by the organic electrolytes, they do not possess the thermal stability sufficient to withstand the sterilizing temperatures to which components of space vehicles must be subjected.

To avoid these difficulties, this invention provides for the molding of battery containers from polymeric mixtures which produce a hard, cross-linked, cyclized aliphatic resin. These resins are a product of the reaction of a polyfunctional polydiene prepolymer having mainly pendant vinyl groups on alternate carbon atoms of an elongated backbone carbon chain and a polyfunctional hydrocarbon or a polyfunctional polyether with a polyfunctional organic chain extender capable of reacting with the functional groups of the polydiene and a peroxide free radical initiator capable of promoting the cyclization of the pendant vinyl groups and the cross-linking of adjacent chains.

Polydiene prepolymers used in production of the sterilizable battery containers of this invention should have predominantly pendant vinyl groups on alternate carbon atoms of the backbone carbon chain, preferably constituting at least 80% of the olefinic unsaturation, and should preferably have a molecular weight from about 500 to about 3000. The preferred polydiene is 1,2-polybutadiene, although 3,4-polyisoprene is also suitable. Difunctional compounds characterized by terminal substitution are preferred, however, other polyfunctional prepolymers having functional groups located near the opposite ends of the molecule, but not necessarily the terminal positions, may be used. While a dihydroxy substituted prepolymer is generally preferred, mainly from the standpoint of ease of reactability, a dicarboxy substituted compound or other polydienic prepolymer having chemically functional groups preferably terminally positioned will also be satisfactory.

Several long chain polyether polyols are suitable for use as the prepolymers in these resins. Selection from the wide range of available polyether polyols should be governed with the properties of the end product in mind. Generally, polyether polyols used in resins according to this invention should have a molecular weight between 240 and 4200. Typical polyether polyols which are suitable as prepolymers are as follows:

TABLE I polyoxypropylene glycols
polyoxypropylene triols
polyoxytetramethylene glycols
polyoxybutylene glycols
polyoxybutylene triols Long chain hydrocarbon diols in the molecular weight range of 250 to 3000 are subject to the same considerations set forth above for the polyethers. Typical hydrocarbon diols which are suitable as prepolymers are as follows:

TABLE II 1,4-polybutadienediol homopolymer
dihydroxy 1,4-polybutadiene styrene copolymer
dihydroxy 1,4-polybutadiene acrylonitrile copolymer
hydrogen saturated 1,4-polybutadienediol homopolymer
hydrogen saturated dihydroxy 1,4-polybutadiene styrene copolymer
hydrogen saturated dihydroxy 1,4-polybutadiene acrylonitrile copolymer
hydrogen saturated 1,2-polybutadienediol homopolymer
polyisobutylenediol homopolymer Selection of a suitable organic chain extender is dependent upon the functional groups of the prepolymers. Where the functional groups on the prepolymers are hydroxyl, chain extenders should be diisocyanates, diacid halides, diacids, or diesters. Where the functional groups on the prepolymers are carboxyl, the chain extenders should be diepoxides, diimines, diols, and diaziridenes. The aliphatic or aromatic organic chain extenders are preferably difunctional, but may contain more than two functional groups.

The organic diisocyanate chain extenders used to produce these resins may be any of a number of known organic diisocyanates which are used in urethane plastics. Typical of diisocyanate compounds which may be used to produce the resins of this invention are:

TABLE III 2,4-toluene diisocyanate
hexamethylene diisocyanate
2,6-toluene diisocyanate
dianisidine diisocyanate
1,4-benzenediisocyanate
p,p'-diisocyanate diphenyl methane
1-chlorophenyl-2,4-diisocyanate
trimethylene diisocyanate
pentamethylene diisocyanate
butylene-1,2-diisocyanate
butylene-1,4-diisocyanate
xylene diisocyanate
2,4-cyclohexylene diisocyanate
1,1-dibutyl ether diisocyanate
1,6-cyclopentane diisocyanate
2,5-indene diisocyanate
diphenylmethane diisocyanate 1,5-naphthalene diisocyanate
triphenylmethane diisocyanate The urethane bond joining the chains of the polydienediol and hydrocarbon or polyether polyol prepolymers employing diisocyanates is desirable in that there is no formation of condensation products such as water or ammonia. The absence of a volatile condensation product makes the reaction particularly useful in the formation of adhesive bonds, laminates, and compact resin masses. Additionally, the urethane copolymer mixture is castable and upon reaction which occurs at a moderately low temperature, produces a long shelf-life, tack-free, rubbery material. The urethane rubber resulting from the diisocyanate reaction has a peroxide free radical initiator molecularly dispersed throughout which is required for the cyclizing and cross-linking reaction to produce the hard thermosetting resin.

There are other possible combinations of chain extension compounds which can produce resins equivalent to those obtained from the diisocyanates-dihydroxy polydiene prepolymer hydrocarbon or polyether prepolymer combinations. For instance, reaction of the dihydroxy prepolymers with dicarboxylic acids, diacid halides, diesters, anhydrides and dianhydrides will produce a resin with blocks capable of cyclization that has been chain extended through polyester groups. The use of dicarboxylic acids, diacid halides, and diesters for chain extension results in the formation of chemical by-products which may be volatile, thereby making these particular combinations less desirable for many applications. Dianhydrides are preferable because chain extension is effected without formation of chemical by-products.

Other possible combinations of reactants can produce cyclized, cross-linked polydiene resins in addition to those utilizing the dihydroxy polydiene prepolymers. For example, polydiene dicarboxylic acid prepolymers having pendant vinyl groups on alternate carbon atoms on the backbone can be chain extended with a variety of compounds such as diols, diamines, diisocyanates, diepoxides, diimines, and diimides. Polydiene dicarboxylic acids chain extended with diepoxides, diimines, and diimides are preferred for the purposes of this invention because chemical by-products are not formed in the reaction. Typical polydiene dicarboxylic acids include the 1,2-polybutadiene dicarboxylic acid and the 3,4-polyisoprene dicarboxylic acid structures. It will be appreciated that other derivatives of the dicarboxylic acid polydienes, can be used such as diacid halides, polyanhydrides, and diesters and suitable chain extenders will yield equivalent chain extended thermosetting polydiene resins.

Analogous useful resins which can produce cyclized and cross-linked polydiene-hydrocarbons or polyethers as polymers can be prepared from polyfunctional polydiene and hydrocarbon or polyether amines. For example, polydiene compounds will consist of 1,2-polybutadiene or 3,4-polyisoprene structures that have terminal amine groups and hydrocarbon or polyether diamines such as 1,4-polybutadiene diamine may be chain extended by a number of difunctional and polyfunctional chain extenders. Typical diamine chain extenders that provide products that are useful for the purposes of this invention are diisocyanates, anhydrides, dianhydrides, dicarboxylic acids, diacid chlorides, diesters and diepoxides. Similarly as before, the chain extenders such as diisocyanates, dianhydrides and diepoxides which produce no secondary product are preferable for the purposes of this invention.

Among the acids and anhydried chain extenders that may be employed are:

TABLE IV adipic acid
fumaric acid
1,4-cyclohexanedicarboxylic acid
terephthalic acid
malonic acid
azelaic acid
sebacic acid
isophthalic acid
endo-cis bicyclo (2,2,1)-5-heptene-2,3-dicarboxylic dianhydride
succinic anhydride
dodecenyl succinic anhydride
tetrahydrophthalic anhydride
hexahydrophthalic anhydride
maleic anhydride
phthalic anhydride
glutaric anhydride
1,4,5,6,7,7-hexachlorobicyclo-(2,2,1)-5-heptene-2,3-dicarboxylic anhydride
tetrachlorophthalic anhydride Suitable dianhydrides and polyanhydride chain extenders include the following:

TABLE V 3,3',4,4'-benzophenone tetracarboxylic dianhydride
polyazelaic polyanhydride
pyromellitic dianhydride
pyromellitic dianhydride-glycol adducts
1,2,3,4-cyclopentanetetracarboxylic dianhydride Suitable diepoxide chain extenders include the following:

TABLE VI bis-epoxydicyclopentyl ether of ethylene glycol
1-epoxyethyl-3,4-epoxycyclohexane
dicyclopentadiene dioxide
3,4-epoxy-6-methylcyclohexylmethyl-3,4-epoxy-6-methylcyclohexane-carboxylate
zeaxanthin diepoxide
9,10-epoxy-12-hydroxyoctadecanoic acid, triester with glycerol Suitable diimine, diimide and triimide chain extenders include the following:

TABLE VII 1,6-hexane, N,N'diethylenimine
1,6-hexane, N,N'dipropylenimine
1,7-heptane, N,N'diethylenimine
1,7-heptane, N,N'dipropylenimine
1,8-octane, N,N'diethylenimine
1,8-octane, N,N'dipropylenimine
1,3-di (carboxy-N-propylenimide) benzene
1,3,5-tri (carboxy-N-propylenimide) benzene
1,3-di (ethylene-N-1,2-butylimine) benzene In some applications, a catalyst may be supplied to accelerate the chain extension reaction. For example, in the formation of the urethane bond between the diisocyanate and the dihydroxypolydiene and dihydroxy hydrocarbon or polyether prepolymers it is sometimes desirable to provide a catalyst which promotes polyurethanation. Suitable catalysts to promote the formation of the chain extending bonds through the reactions of other compounds are well known in the art. Similarly, the conditions generally favoring the reactions involving other combinations of reactants are known. For example, the chain extension reaction occurring between a dicarboxylpolydiene prepolymer and a dicarboxylic hydrocarbon or polyether prepolymer with a diimine organic chain extender will be usually carried out in the range of 20 to 90° C. and that of a dicarboxylpolydiene prepolymer and a dicarboxylic hydrocarbon or polyether prepolymer, a diepoxide chain extender generally in the range of 50 to 120° C. Where the polydiene and the hydrocarbon or polyether prepolymer structures carry terminal amine groups the reaction with a diisocyanate to form a polyurea chain extending linkage is carried out generally in the range of 0 to 50° C. In the instance where the dihydroxy polydiene prepolymer and dihydroxy hydrocarbon or polyether prepolymer are extended through an ester linkage through reaction with a dibasic acid, the reaction is typically carried out in the range of 80 to 135° C. A dianhydride chain extension with dihydroxypolydiene prepolymers and dihydroxy hydrocarbon or polyether prepolymers will proceed in temperature range approximately 20° to 30° C. lower than that of the dibasic acid reaction. A chain extension employing a diacid chloride reacting with a dihydroxypolydiene prepolymer and a dihydroxy hydrocarbon or polyether prepolymer will proceed in the general range of 40° to 100° C. It will be appreciated that the presence or absence of a catalyst will have a bearing upon the reaction conditions. The foregoing temperature ranges are provided to give only an indication of general conditions and are not intended to be limiting.

Important to the curing steps of the process are the aliphatic and aromatic peroxide free radical initiators. These peroxide initiators are instrumental in the cyclization of the pendant vinyl groups of the polydiene and the cross-linking of adjacent chains. The peroxide initiator is introduced into the initial mixture along with the polydiene prepolymer and the organic chain extender whereupon it becomes molecularly dispersed throughout the ensuing elastomeric polymer. Upon the application of heat in the final step, the peroxide initiator decomposes to provide free radicals which force the pendant vinyl groups to join to form cross-linked, cyclized aliphatic chains.

Organic peroxides which may be used to assist the resin cure are:

TABLE VIII di-t-butyl peroxide
2,5-dimethyl-2,5-bis(tertiary butylperoxy) hexane
n-butyl-4,4-bis(tertiary butylperoxy) valerate
2,5-dimethyl-2,5-bis(tertiary butylperoxy) hexyne-3
tertiary-butyl perbenzoate
dicumyl peroxide
methyl ethyl ketone peroxide
cumene hydroperoxide
di-N-methyl-t-butyl percarbamate
lauroyl peroxide
acetyl peroxide
decanoyl peroxide
t-butyl peracetate
t-butyl peroxyisobutyrate In preparing these resins, the polyfunctional organic chain extender should be mixed in an approximately stoichiometric amount to the polydiene prepolymer. Adjustments are necessary when other ingredients such as copolymeric prepolymers or internal plasticizers are employed, but approximately stoichiometric amounts of the organic chain extender with respect to the prepolymeric ingredients are the preferred quantities. The peroxide is generally employed in an amount within the range of 0.5% to 10% by weight of the prepolymer, and preferably within the range of 2% to 6%. It will be appreciated that larger or smaller amounts of the peroxide may be employed and that the optimum amount is dependent upon, among other things, the particular peroxide initiator used, the polydiene prepolymer employed, and the chain extender selected for the reaction.

After the ingredients have been mixed, the polymeric liquid should desirably be degassed in vacuum to remove entrapped air and volatile impurities. A chain extending reaction proceeds at room temperature or moderately elevated temperatures to produce an elastomeric intermediate material characterized by having the peroxide free radical initiator molecularly dispersed throughout. The chain extension reaction may be catalyzed to reduce reaction temperature or time by catalytic agents which are standard art, providing they do not interfere with the subsequent cyclization and cross-linking step. While the polymer is in this elastomeric state it may be easily handled. When the article has been coated, the rubbery intermediary is heated in the range of 150° F. to 400° F. whereupon cyclization and cross-linking takes place to produce a tough, stiff, transparent plastic.

Battery containers of this invention are prepared by casting the liquid ingredients in a mold of the desired configuration. Metal electrodes can be incorporated in the container structure by casting of the liquid ingredients around them since the cyclized resins adhere well to metals. Upon formation of the elastomeric material in the mold, the container may be cured to the hard resin either by raising the temperature of the mold, or by removing the molded elastomeric article from the mold and curing it in an inert atmosphere oven.

The containers may be formed in one or more pieces depending upon production expedients. If one piece construction is desired, the liquid polymeric material is molded around the electrodes and access holes are drilled in the top to provide means for filling with electrolytes. If two or more piece construction is desired, the parts are cast in their respective molds and are removed when the elastomeric stage is formed. The elastomeric sections can then be assembled and bonded by contact with minimum mechanical pressure while being cured in an inert atmosphere oven.

When special material properties are desired in the battery container, fillers may be added to the liquid prepolymer prior to casting. To permit better mixing, toluene or preferably styrene may be added to the liquid prepolymer mixture. If toluene is employed as the thinning agent, the mixture must be allowed to stand until the toluene has evaporated. If styrene is employed as the thinning agent, no removal step is necessary as it becomes an internal plasticizer. The addition of these thinning agents causes the thorough wetting of the filler powder, and a more homogeneous mixture is effected.

Filler powders to be used may be drawn from a wide range of materials. Suitable materials may be selected from synthetic fabrics, carbon, asbestos, silica, glass, silicates, plastics, etc. Chemical inertness of the filler with respect to the surrounding resin matrix and the electrolytes which will be used in the battery are prime factors for consideration when selecting the filler.

Battery containers, according to this invention, provide a material which is thermally and chemically stable. These battery containers are also resistant to degradation in the presence of ultraviolet radiation. These containers are especially suitable for space applications which require lightweight construction without the sacrifice of strength and ability to withstand sterilizing conditions consisting of at least 350 F. for 144 hours.

We claim:
1. A sterilizable battery container comprising:
   a hard resinous material thermally molded from a liquid polymeric mixture containing (A) a polydiene having (i) polyfunctional groups selected from the group consisting of hydroxyl, carboxyl, and amino and (ii) a predominant amount of vinyl groups on alternate carbon atoms of the polydiene backbone, (B) an aliphatic block copolymer compound selected from the group consisting of (1) hydrocarbons having (i) the olefinic unsaturation situated predominantly in the backbone carbon chain and (ii) polyfunctional groups selected from the group consisting of hydroxyl and carboxyl and (2) polyethers having polyfunctional groups selected from the group consisting of hydroxyl and carboxyl, (C) an organic chain extender capable of reacting with the functional groups of the polydiene, and (D) a peroxide free radical initiator.

2. A battery container according to claim 1 wherein the polydiene is selected from the group consisting of 1,2-polybutadiene and 3,4-polyisoprene.

3. A battery container according to claim 1 wherein the chain extender capable of reaction with the hydroxyl functional groups on the polydiene is selected from the group consisting of (a) diisocyanate substituted aliphatic compounds, (b) diisocyanate substituted aromatic compounds, (c) diacid halide substituted aliphatic compounds, (d) diacid halide aromatic compounds, (e) dicarboxylic acid substituted aliphatic compounds, (f) dicarboxylic acid substituted aromatic compounds, (g) diester substituted aliphatic compounds, and (h) diester substituted aromatic compounds.

4. A battery container according to claim 1 wherein the chain extender capable of reaction with the functional groups on the polydiene is selected from the group consisting of (a) diepoxide substituted aliphatic compounds, (b) diepoxide substituted aromatic compounds, (c) diamine substituted aliphatic compounds, (d) diamine substituted aromatic compounds, (e) dihydroxyl substituted aliphatic compounds, (f) dihydroxyl substituted aromatic compounds, (g) diaziridine substituted aliphatic compounds, and (h) diaziridine substituted aromatic compounds.

References Cited
UNITED STATES PATENTS 3,431,235   3/1969   Burns et al. _____ 260—47

JOSEPH L. SCHOFER, Primary Examiner

J. C. HAIGHT, Assistant Examiner

U.S. Cl. X.R.

136—166; 206—2; 260—2, 77.5, 78, 78.4, 80